US009635975B2

(12) United States Patent
Walker

(10) Patent No.: US 9,635,975 B2
(45) Date of Patent: May 2, 2017

(54) STIR-THROUGH LID FOR COOKWARE

(71) Applicant: TONOGA, INC., Petersburgh, NY (US)

(72) Inventor: Kelly E. Walker, Vero Beach, FL (US)

(73) Assignee: TONOGA, INC., Petersburgh, NY (US)

( * ) Notice: Subject to any disclaimer, the term of this patent is extended or adjusted under 35 U.S.C. 154(b) by 0 days.

(21) Appl. No.: 15/059,335

(22) Filed: Mar. 3, 2016

(65) Prior Publication Data

US 2016/0255994 A1    Sep. 8, 2016

Related U.S. Application Data

(60) Provisional application No. 62/127,352, filed on Mar. 3, 2015.

(51) Int. Cl.
*A47J 36/06* (2006.01)
*A47J 36/02* (2006.01)

(52) U.S. Cl.
CPC ............ *A47J 36/06* (2013.01); *A47J 36/025* (2013.01)

(58) Field of Classification Search
CPC  A47J 36/06; A47J 36/08; A47J 36/025; A47J 43/287; A47J 43/288; A47J 47/16; B65D 47/2031; B65D 47/2018; B65D 47/20; B65D 51/246; B65D 51/24
USPC ...... 220/229, 212.5, 212, 573.2, 573.1, 912; 220/735, 731, 377, 287; 277/634, 628; 366/347; D7/354; 248/37.6, 37.3
See application file for complete search history.

(56) References Cited

U.S. PATENT DOCUMENTS

| 1,328,652 A * | 1/1920 | Ehlers ................ B65D 51/246 366/347 |
| 2,559,196 A | 7/1951 | Medved |
| 3,038,402 A * | 6/1962 | Singer ..................... A47J 36/06 126/43 |
| 3,349,948 A | 10/1967 | Hughes |
| 5,481,967 A | 1/1996 | Chen |
| 5,724,885 A | 3/1998 | Uy |
| 5,749,286 A * | 5/1998 | Payette ................. A47J 37/101 30/323 |
| RE36,072 E | 2/1999 | Uy |
| 5,881,633 A | 3/1999 | Adams |

(Continued)

FOREIGN PATENT DOCUMENTS

CN       201157270 Y    12/2008
CN       103239141 A     8/2013
(Continued)

*Primary Examiner* — Robert J Hicks
(74) *Attorney, Agent, or Firm* — Heslin Rothenberg Farley & Mesiti, P.C.

(57) ABSTRACT

A see-through and stir-through lid is provided for cookware. The lid includes a transparent main body having an outer periphery. An access port extends through the main body with a splatter guard secured within the access port. The splatter guard has a self-regulating opening of variable size allowing passage of a working end of a cooking utensil through the opening in the splatter guard while minimizing size of the opening about a shaft of the cooking utensil. A support structure supports a cooking utensil atop the lid with the working end resting above the splatter guard so that liquid and/or food residue may drain through the opening in the splatter guard into the cookware.

20 Claims, 6 Drawing Sheets

(56) References Cited

U.S. PATENT DOCUMENTS

| | | | |
|---|---|---|---|
| 5,943,947 A | | 8/1999 | Adams |
| 7,485,831 B2 | | 2/2009 | Tynes et al. |
| 8,567,632 B2 | | 10/2013 | Bergeret et al. |
| 2008/0078762 A1 | * | 4/2008 | Iyer .................... B65D 47/2031 220/229 |
| 2011/0174163 A1 | | 7/2011 | Jenniges |
| 2012/0132652 A1 | | 5/2012 | Barber |
| 2014/0034650 A1 | * | 2/2014 | Thomaschewski ... A47J 27/002 220/573.1 |
| 2016/0066743 A1 | * | 3/2016 | Prommel .............. A47J 43/287 220/573.1 |

FOREIGN PATENT DOCUMENTS

| | | |
|---|---|---|
| DE | 4009361 A1 | 8/1990 |
| DE | 19701984 A1 | 7/1997 |
| GB | 355429 | 8/1931 |
| JP | 2002095591 A | 4/2002 |
| WO | 2006064306 A1 | 6/2006 |

* cited by examiner

STIR-THROUGH LID FOR COOKWARE

CROSS REFERENCE TO RELATED APPLICATIONS

This application claims priority of provisional application No. 62/127,352 filed on Mar. 3, 2015, the entire contents of which is hereby incorporated herein by reference.

BACKGROUND OF THE INVENTION

The present invention relates to a lid for pots, pans and other cookware, and more particularly, to a lid that can be seen through, stirred through, and used as a cooking utensil rest while cooking.

Certain foods require continual stirring while they cook. Some of these foods need to reach a rolling boil, others just need to be brought to a boiling point. In this process, if the cooking vessel is uncovered, foods will "pop" and splatter creating a mess in the cooking environment, i.e., on the stove top, nearby counters and the cook's clothes, and potentially injure the cook.

A need thus exists for a product that prevents skin burns, stained clothes and messy cook tops and counters resulting from splattering food while permitting the food to be stirred during the cooking process.

Accordingly, an objective of the present invention is to provide a cookware lid that facilitates stirring, mixing or other manipulation of the contents of cookware while the lid remains in place on top of the cookware, effectively prevents splattering even when a cooking utensil is introduced through the lid and while the cooking utensil is manipulated to stir the contents of the cookware, and enables visual observation of the cooking process. Another objective is to provide a cookware lid that supports a cooking utensil, when not in use, on top of the lid in a position that facilitates draining of liquid or food residue from the working end of the utensil back into the cookware.

BRIEF SUMMARY OF THE INVENTION

This need is met, the stated objectives are satisfied, and numerous benefits are achieved, by the stir-through cookware lid of the present invention.

According to the present invention, a stir-through lid for cookware includes: a transparent main body having an outer periphery; an access port extending through the main body; a splatter guard secured within the access port, the splatter guard having a self-regulating opening of variable size allowing passage of a working end on a shaft of a cooking utensil through the opening and minimizing size of the opening about the shaft; and a support structure for supporting the cooking utensil, when not in use, atop the lid with the working end of the cooking utensil resting above the splatter guard, whereby liquid and/or food residue on the working end of the cooking utensil can drain through the opening of the splatter guard into the cookware. The lid may further include a gasket secured to the outer periphery of the transparent main body for engaging a top rim of a sidewall of the cookware. Advantageously, a bottom surface of the gasket may have alternating groves and ridges for selectively engaging cookware of different widths or diameters.

The transparent main body may be arcuate or dome shaped, and the access port is, preferably, geometrically centered in the main body.

The splatter guard may have a concave upper surface, and the self-regulating opening of variable size may comprise a centered through hole connected to at least one radially extending through slit in the splatter guard. Preferably, the self-regulating opening of variable size may include multiple radially extending through slits intersecting the centered through hole.

The splatter guard preferably comprises a resilient rubber or silicone based material.

The support structure of the lid extends upwardly from at least one of the main body and the gasket. The support structure is advantageously contoured to retain the cooking utensil atop the lid, when the utensil is not in use.

Advantageously, the support structure may be configured to also serve as a handle of the lid. In one embodiment, the support structure connects the gasket to the splatter guard. The gasket, support structure and splatter guard may be a unitary structure. Preferably, the support structure comprises heat resistant material.

The present invention further contemplates a combination of the lid and the cookware. The cookware may comprise a pan, a pot, a wok or other food cooking vessel. The cookware may include an interior non-stick surface.

The present invention also contemplates a combination of the lid and a cooking utensil. The working end of the cooking utensil may comprise a spatula, a mixing blade, a whisk, a spoon, a slotted spoon, a fork or a ladle.

The cooking utensil further includes a handle end at an opposite end of the shaft than the working end. The handle end may be configured to allow a user to grasp and manipulate the utensil when the shaft extends through the opening in the splatter guard.

The current invention further contemplates a combination of the lid, and the cookware and the cooking utensil. Moreover, a combination of the lid with cookware of different widths and with cooking utensils having different working ends is also contemplated by the present invention.

BRIEF DESCRIPTION OF THE DRAWING FIGURES

The features, operation and benefits of the stir-through cookware lid of the present invention will be readily understood from the following detailed description, taken in conjunction with the accompanying drawing figures, in which.

Figure 5:
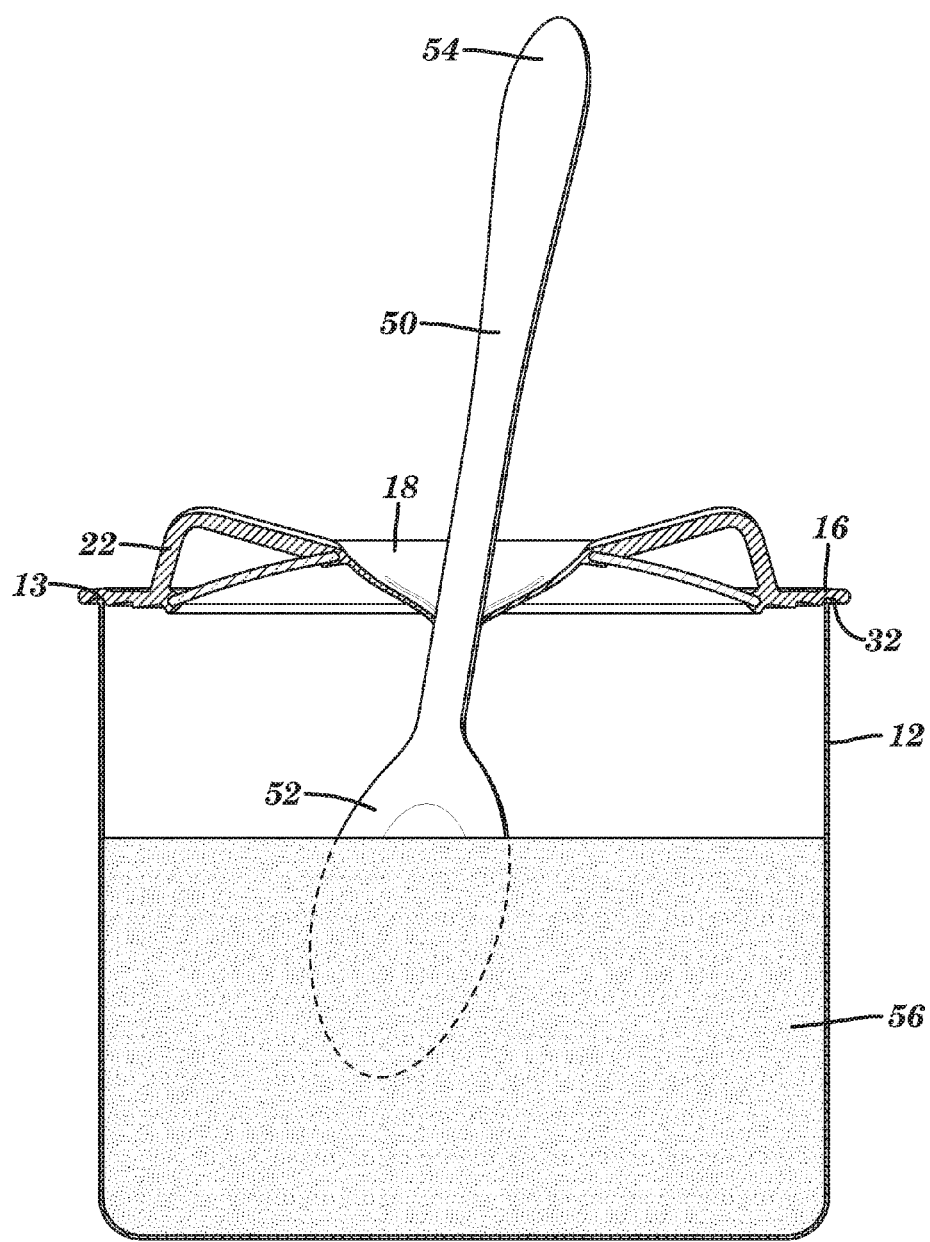
Figure 6:
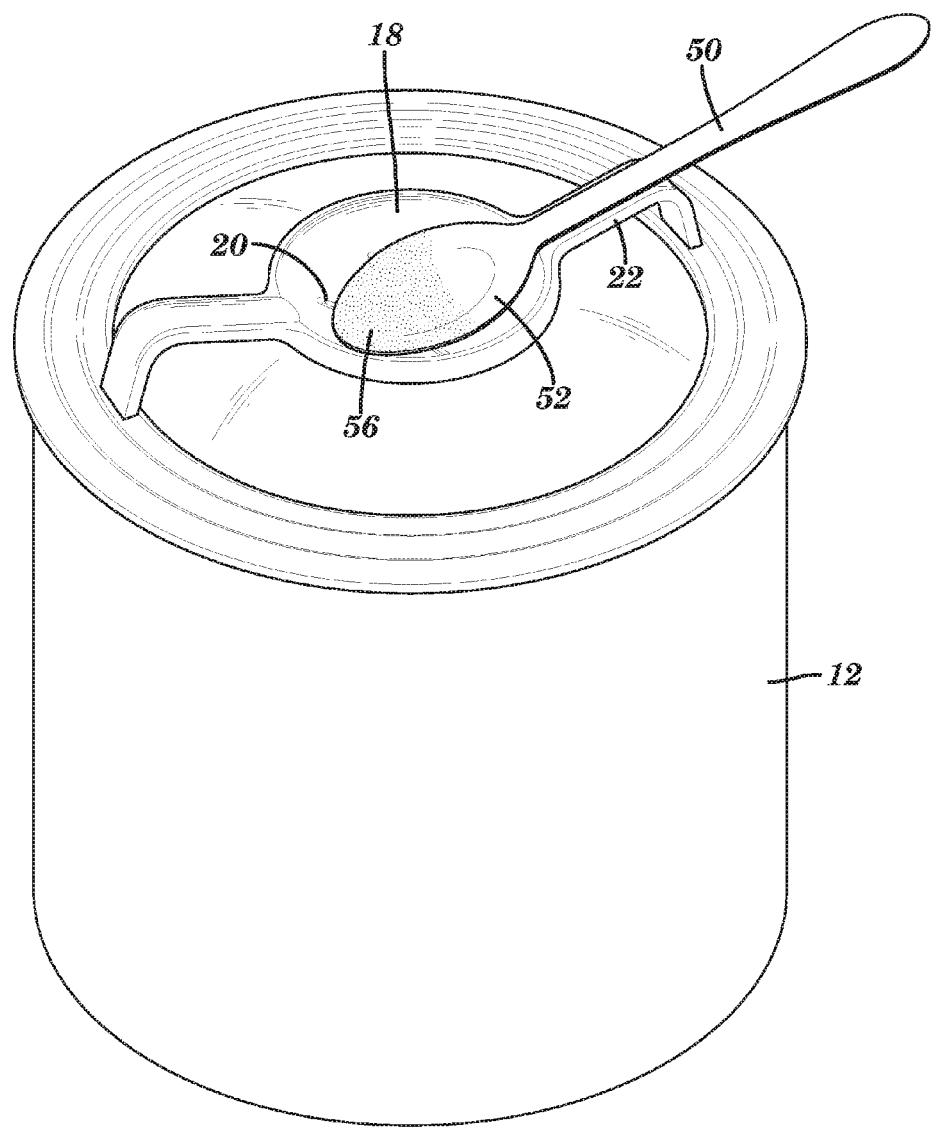

FIG. 5 is a cross-sectional view illustrating the use of a cooking utensil introduced through the access port and splatter guard of the lid for stirring or otherwise manipulating the contents of the cookware; and FIG. 6 is a perspective view illustrating support of a cooking utensil atop the lid with the working end of the utensil resting above the splatter guard of the lid so that liquid and/or food residue can drain through the opening of the splatter guard into the cookware.

DETAILED DESCRIPTION

The stir-through cookware lid of the present invention facilitates stirring, mixing or other manipulation of the contents of cookware without removing the lid, while simultaneously avoiding, or at least minimizing, splatter even when conducting such food manipulating operations. Further, the lid provides for observation of the cooking process, the cooking food and the food manipulating operation right through the lid. Additionally, the lid provides a supporting structure for the cooking utensil, when not in use, atop the lid, with the working end resting above the splatter guard thereby allowing liquid and/or food residue to drain through the opening in the splatter guard into the cookware.

By permitting visualization, and stirring, mixing or other manipulation of food in the cookware directly through the lid, while simultaneously minimizing splatter, the stir-through cookware lid of the present invention avoids the mess and potential injury that can occur with uncovered stirring of hot or boiling contents of cookware. When the stirring, mixing or other food manipulation is complete, the cooking utensil may be easily removed through the opening in the splatter guard and placed upon the support structure of the lid in such a way that any liquid and/or food residue drips and drains from the working end of the cooking utensil through the opening in the splatter guard and into the cookware. The same lid may fit on several different sized pots or pans. The lid maintains the integrity of the contents of the cookware, and facilitates safe and efficient cooking by young or new, or even experienced cooks, of various foods including jams, jellies, sauces, etc.

Figure 1:
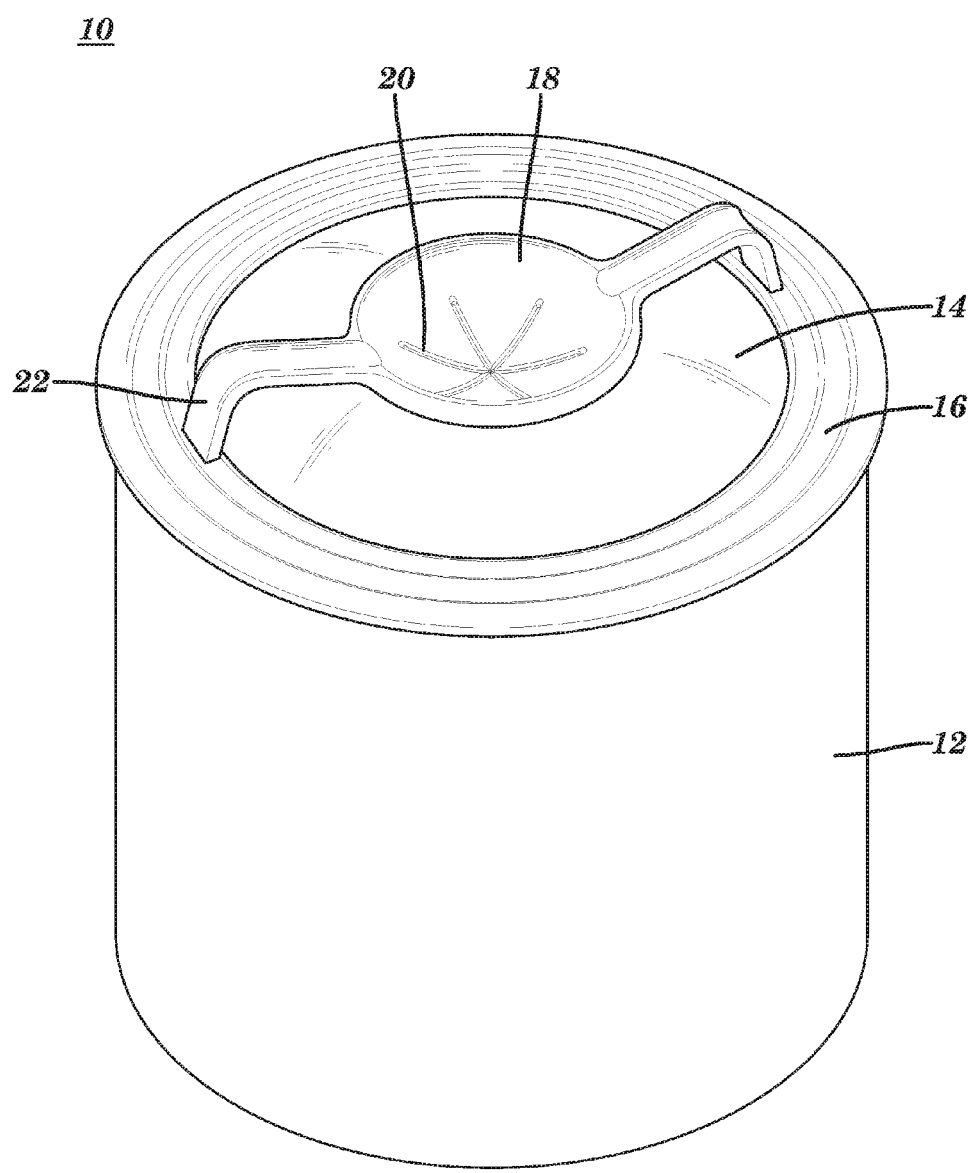
FIG. 1 is a perspective view of the stir-through lid of the present invention resting atop cookware.

As illustrated in FIG. 1, the stir-through lid 10 of the present invention is designed to rest upon, close, cover and seal cookware 12. The lid allows the contents of cookware 12 to be seen through and stirred directly through the lid itself. Further, the lid provides a supporting structure for supporting a cooking utensil atop the lid with a working end of the utensil resting in a position such that residue food and/or liquid drains back into the cookware through the lid. Advantageously, the lid is dishwasher safe.

Cookware 12 may comprise any cooking or food preparation vessel including a pot, a pan, a wok or other cooking vessel. Such cookware is most often cylindrical in shape, but other shapes or configurations including, but not limited to, square or rectangular, are possible.

Cookware 12 may be constructed of a metal, for example, aluminum, copper, cast iron, stainless steel, carbon steel, or non-metallic material such as a glass ceramic or pottery, or a composite of such materials. The interior surface of the cookware may be coated with a non-stick surface such as PTFE.

Cookware 12 may be provided with one or more handles (not shown), preferably of non-heat conducting material. The cookware may be heated on a stove top using gas, electrical coils, induction or other processes. The cookware may also be heated in a microwave or oven, with intermittent stirring of the contents.

Returning to the drawing figures, the lid 10 includes a transparent main body 14 having an outer periphery or edge 24. The main body preferably has an arcuate, convex or dome shape, although a flat, concave or complex shape is also possible. The main body is preferably fabricated of a transparent heat-resistant material such as tempered glass or a high density, shatter resistant, see-through plastic.

A gasket 16 is preferably secured, in any known fashion, to the outer periphery or edge 24 of main body 14. As best seen in FIG. 1, the gasket 16 may have an annular configuration when the outer periphery of main body 14 is circular. Alternatively, the outer periphery of the main body may be square, rectangular or have a different configuration correlated to the shape of cookware 12, with gasket 16 forming a correspondingly shaped border.

Figure 2:
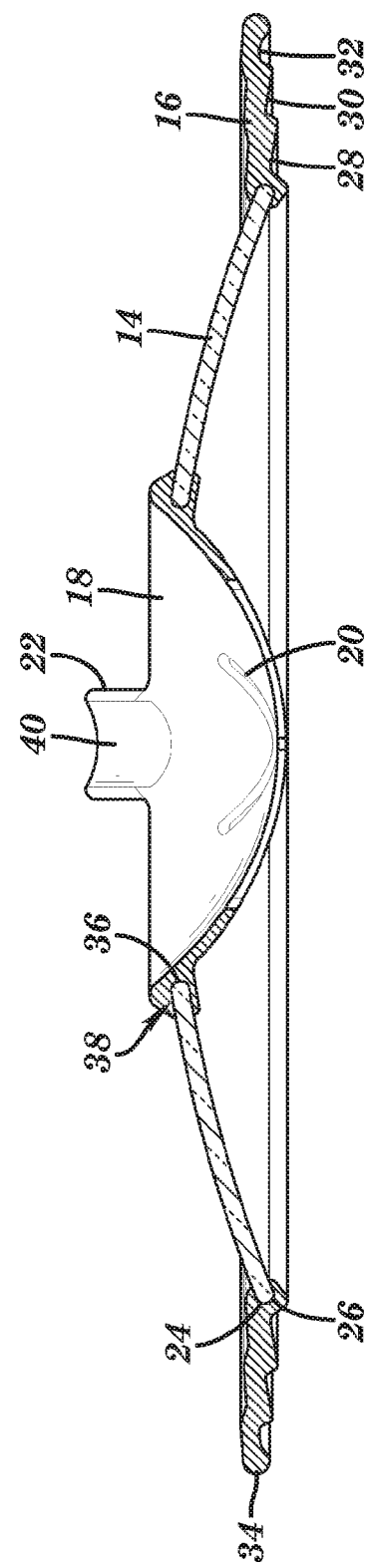
FIG. 2 is a cross-sectional view of the lid illustrating its construction.
Figure 3:
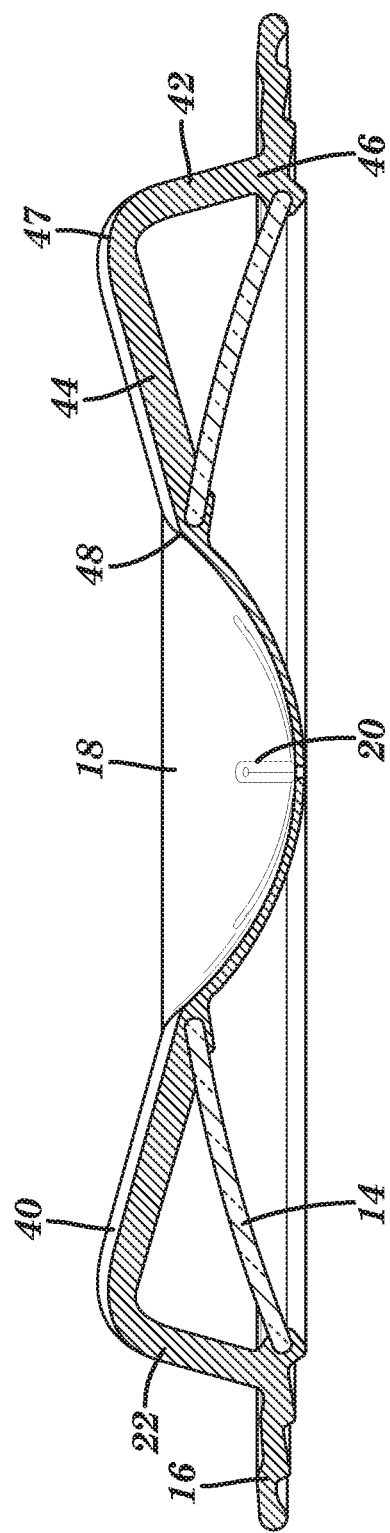
FIG. 3 is another cross-sectional view of the lid illustrating one embodiment of a support structure that serves as both a lid handle and a support for a cooking utensil when the utensil is not in use.

Gasket 16 preferably comprises a high heat resistant silicone material. As illustrated in FIGS. 2 and 3, a bottom surface of gasket 16 may be calendared to include, between inner end 26 and outer end 34, a series of alternating grooves 28, 30, 32 and ridges, to enable the same lid to fit on cookware of several different widths or diameters.

As illustrated in FIG. 5, a groove, e.g., groove 32, on the bottom surface of gasket 16, may rest upon a corresponding top edge or rim 13 of a side wall of cookware 12. The gasket 16 may sealingly engage the top edge 13 of cookware 12.

Lid 10 also includes an access port comprising a through opening bordered by inner edge 36 of main body 14. The access port is preferably geometrically centered in main body 14, although other locations within main body 14 are also possible.

A splatter guard 18 is secured within the access port. The splatter guard 18 preferably has an outer peripheral portion 38 engaging inner edge 36 of main body 18, an upper, concave surface with a centered through hole 19 and at least one, and, preferably multiple through slits 20 extending radially inward from an outer end 21 and intersecting through hole 19.

Figure 4:
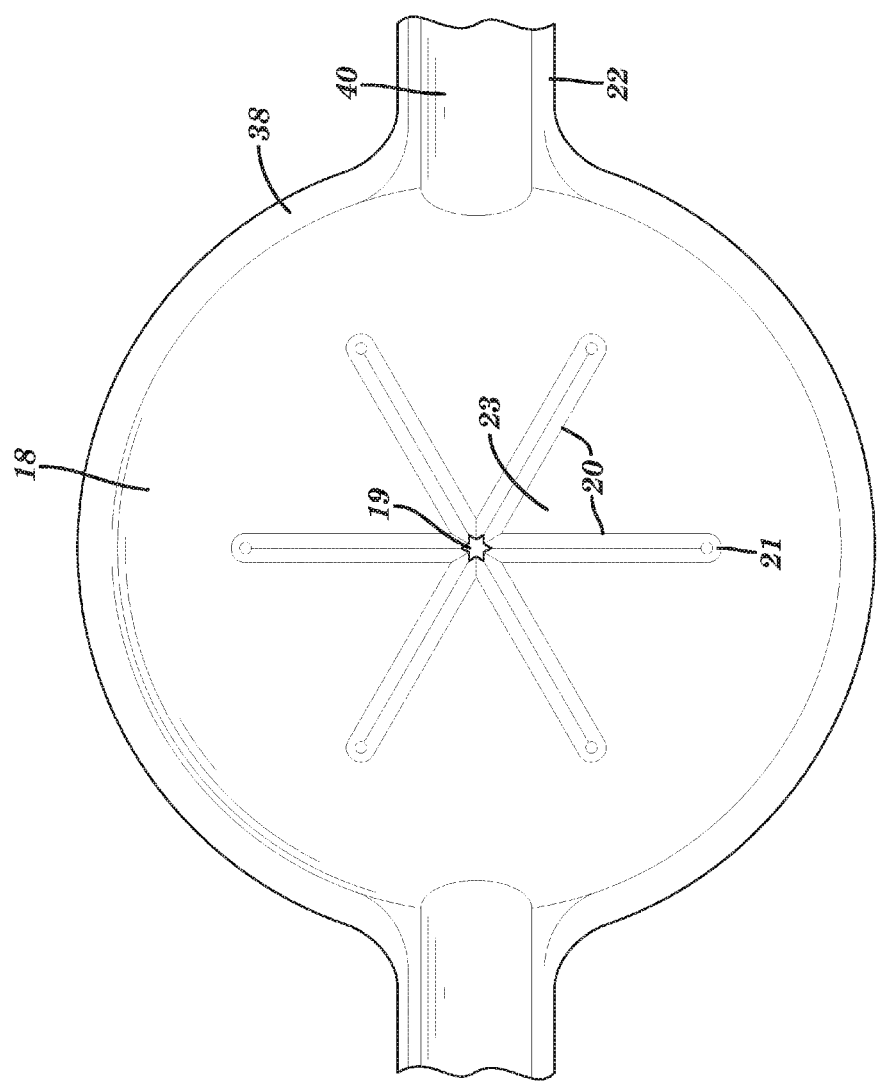
FIG. 4 is an enlarged top plan view of the splatter guard of the present invention.

As most clearly seen in the enlarged top plan view of FIG. 4, six evenly spaced radially extending through slits 20 may be positioned about and intersect centered through hole 19. The number, positioning, radial extent, width, orientation and shape of slits 20 may vary from that illustrated. A flexible, resilient, tapered flap 23 exists between each pair of adjacent slits.

This construction allows for introduction of the working end 52 of a cooking utensil 50 through an opening formed by the centered through hole 19 and expanded, as necessary, by slits 20 in the splatter guard 18, while minimizing the size of the opening around the central shaft portion of the cooking utensil, when the utensil is in use.

Splatter guard 18 may be constructed of rubber or silicone based material having a desired resiliency and heat resistant properties. The described construction allows for the introduction of the working end of a cooking utensil into the cooking chamber through the splatter guard 18 and ensures that the splatter guard closes around the shaft of the cooking utensil to minimize the size of the opening and thereby protect the hand of the user from splattering.

Positioned atop lid 10 is a support structure 22 which advantageously serves as both a handle for the lid and a support for a cooking utensil 50 when the utensil is not in use. Although the support structure 22 may take many different forms, a presently preferred embodiment is illustrated in the drawing figures.

As illustrated in FIG. 1, a pair of support structures 22 may be positioned on opposite sides of splatter guard 18. As best seen in the cross-sectional view of FIG. 3, each support structure 22 includes a first portion 42 extending upwardly from a base 46 to a bend 47, and a downwardly inclined second portion 44 extending from the bend 47 to an inner end 48. A top surface 40 of the downwardly inclined second portion 44 may, preferably, have a concave contour, from side to side, to help retain a cooking utensil on the support structure 22. The support structure 22 is preferably fabricated from a heat insulating or resistant material with sufficient rigidity to maintain its shape while serving as a handle for the lid and as a rest or support for a cooking utensil.

In one embodiment, the gasket 16, support structure 22 and splatter guard 18 may be one piece, i.e., of unitary construction, and molded and force fit onto respective edges of main part 14. This unitary construction may be fabricated from silicone or silicon rubber. In one embodiment, the silicon rubber may have a Shore A hardness of 60, a tensile strength of about 11 N/mm$^2$, an elongation at breaking between 580 and 690%, and a matte surface texture. These attributes facilitate compression molding, assembly of the transparent glass main body with the silicon rubber components, and the de-molding process. Other materials, with similar or variant characteristics, may also be employed FIG. 6 illustrates the use of the support structure 22 as a spoon rest. Desirably, the working end 52 of the utensil 50 rests atop the access port and splatter guard 18 such that liquid and/or food residue 56 can drain through the opening in the splatter guard into the interior of cookware 12, when the utensil is not in use. Thus, the cooking utensil is readily available for stirring, mixing or other food manipulation, as needed, and any excess liquid and/or food residue on the working end of the cooking utensil may be returned to the interior of the cookware.

The number, location, shape, material and construction of the support structure 22 may vary from the illustrated embodiment, provided that the supported cooking utensil is stably supported atop the lid with the working end of the utensil resting above the splatter guard to optimally drain liquid and/or food residue through the opening in the splatter guard into the cookware.

Preferably, the support structure is also constructed to serve as a handle for a user to grasp, lift and move the lid. Preferably, the material of the support structure 22 is selected such as to permit direct and safe contact with the user's hand. Alternatively, an oven mitt, pot holder or other hand protector, may be used to contact the support structure 22.

Support structure 22 may extend upwardly from either main body 14 or gasket 16. The support structure may be secured to the main body or gasket using mechanical or other known fastening techniques.

The lid 10 of the current invention is suitable for use with a variety of cooking utensils. Such utensils commonly have a working end 52 at one end of a connecting shaft and a handle end 54 at the other end of the shaft. The handle end allows a user to comfortably grasp and manipulate the utensil. The working end serves to stir, mix or otherwise manipulate food 56 contained within cookware 12, as illustrated in FIG. 5. The working end 52 of the cooking utensil 50 may take the form of a spatula, mixing blade, whisk, spoon, slotted spoon, fork, ladle or the like, depending upon the desired food manipulation.

In one embodiment of the lid of the present invention, the main body 14 may be fabricated from 4 millimeter thick tempered glass having an outer diameter of about 247 mm and an inner diameter, defining the centered access port, of about 105 mm. A silicon rubber gasket 16 may be force fit and molded to the outer periphery of the glass main body. The outer diameter of gasket 16 may be about 321 mm with alternating grooves and ridges on the bottom surface of the gasket positioned to selectively engage 10", 11" and 12" diameter pots. The silicon rubber employed to fabricate the gasket 16, support structure 22 and splatter guard 18 may have a Shore A hardness of about 60, a tensile strength of about 11 N/mm$^2$ and an elongation at breaking in the range of 580-690%. The splatter guard 18 may have a wall thickness of about 2.2 mm and an outer diameter of about 111 mm, with six equally spaced slits 20 radially extending from the center through hole about 36.1 mm.

Preferably, the use of glue is avoided in the construction of the cookware lid. Further, the lid is advantageously dishwasher safe.

Accordingly, the present invention provides a cookware lid that allows a chef to see and stir right through the lid to eliminate any splatter from boiling liquids and the resulting mess and potential injury. The splatter guard permits access and passage of the working end of a cooking utensil therethrough while minimizing the size of the opening about the shaft of the cooking utensil in use. The support structure on the lid conveniently supports the cooking utensil atop the lid with the operating end resting above the access port and splatter guard so that liquid and/or food residue may drain through the opening in the splatter guard into the interior of the cookware. The stir-through cookware lid of the present invention thus makes cooking safe, convenient and clean, for beginning and advanced chefs.

The invention claimed is:

1. A stir-through lid for cookware, comprising:
   a transparent main body having an outer periphery;
   an access port extending through the main body;
   a splatter guard secured within the access port, the splatter guard having a self-regulating opening of variable size allowing passage of a working end on a shaft of a cooking utensil through the opening and minimizing size of said opening about said shaft; and
   a support structure for supporting the cooking utensil, when not in use, atop the lid with the working end of the cooking utensil resting above the splatter guard, whereby liquid and/or food residue on the working end of the cooking utensil can drain through the opening of the splatter guard into the cookware.

2. The lid of claim 1, further comprising a gasket secured to the outer periphery of the transparent main body for engaging an upper rim of a side wall of the cookware.

3. The lid of claim 2, wherein a bottom surface of the gasket has alternating grooves and ridges for selectively engaging cookware of different widths.

4. The lid of claim 1, wherein the transparent main body is arcuate or dome shaped, and the access port is geometrically centered in the main body.

5. The lid of claim 1, wherein the splatter guard has a concave upper surface, and the self-regulating opening of variable size comprises a centered through hole connected to at least one radially extending through slit in the splatter guard.

6. The lid of claim 5, wherein the self-regulating opening of variable size includes multiple radially extending through slits intersecting the centered through hole.

7. The lid of claim 6, wherein the splatter guard comprises a resilient rubber or silicone based material.

8. The lid of claim 2, wherein the support structure extends upwardly from at least one of the main body and the gasket, and is contoured to retain the cooking utensil atop the lid, when the utensil is not in use.

9. The lid of claim 8, wherein the support structure is configured to also serve as a handle for the lid.

10. The lid of claim 8, wherein the support structure connects the gasket to the splatter guard.

11. The lid of claim 10, wherein the gasket, support structure and splatter guard are unitary.

12. The lid of claim 9, wherein the support structure comprises heat resistant material.

13. A combination of the lid of claim 1 and said cookware.

14. The combination of claim 13, wherein the cookware comprises one of a pan, a pot, a wok or other food cooking vessel.

15. The combination of claim 13, wherein the cookware includes an interior non-stick surface.

16. A combination of the lid of claim 1 and said cooking utensil.

17. The combination of claim 16, wherein the working end of said cooking utensil comprises a spatula, a mixing blade, a whisk, a spoon, a slotted spoon, a fork or a ladle.

18. The combination of claim 16, wherein the cooking utensil further includes a handle end at an opposite end of the shaft from the working end, the handle end being configured to allow a user to grasp and manipulate the cooking utensil when the shaft extends through the opening in the splatter guard.

19. A combination of the lid of claim 1 and the cookware and the cooking utensil.

20. A combination of the lid of claim 1 and cookware of different widths and cooking utensils having different working ends.

* * * * *